US005479351A

United States Patent [19]

Woo et al.

[11] Patent Number: 5,479,351

[45] Date of Patent: Dec. 26, 1995

[54] TIME-KEEPING SYSTEM AND METHOD FOR SYNCHRONIZING INDEPENDENT RECORDINGS OF A LIVE PERFORMANCE IN POST-RECORDING EDITING

[75] Inventors: Arthur Woo, Cupertino; David S. Sprague, Portola Valley, both of Calif.

[73] Assignee: Trimble Navigation Limited, Sunnyvale, Calif.

[21] Appl. No.: 363,681

[22] Filed: Dec. 23, 1994

Related U.S. Application Data

[63] Continuation-in-part of Ser. No. 232,830, Apr. 22, 1994.

[51] Int. Cl.[6] .......... G06F 17/00

[52] U.S. Cl. .......... 364/449; 364/424.04; 364/443; 352/12; 348/515

[58] Field of Search .......... 364/443, 449, 364/459, 424.04, 514; 342/357, 457; 73/178 R; 358/452, 335, 149; 354/106; 352/6, 7, 8, 4, 10, 11, 12; 340/825; 348/515

[56] References Cited

U.S. PATENT DOCUMENTS

| | | | |
|---|---|---|---|
| 4,994,971 | 2/1991 | Poelstra | 364/424.04 |
| 5,202,829 | 4/1993 | Greier | 364/449 |
| 5,267,042 | 11/1993 | Tsuchiya et al. | 358/209 |
| 5,296,884 | 3/1994 | Honda et al. | 354/106 |
| 5,335,072 | 8/1994 | Tanaka et al. | 348/232 |
| 5,347,645 | 9/1994 | Perry | 395/550 |
| 5,381,338 | 1/1995 | Wysocki et al. | 364/449 |
| 5,396,431 | 3/1995 | Shimizu et al. | 364/449 |

OTHER PUBLICATIONS

American National Standard for Television–time and control code, ANSI/SMPTE 12M–1986, New York, NY ©1986.

Ed Elliot, "Time Code", unknown publ. date, Foto–Tronics, Burbank, Calif.

"ScoutMaster GPS", brochure, Jun. 1994, Trimble Navigation, Ltd., Sunnyvale, Calif.

*Primary Examiner*—Kevin J. Teska
*Assistant Examiner*—Susan Wieland
*Attorney, Agent, or Firm*—Thomas E. Schatzel

[57] ABSTRACT

A GPS receiver comprises a data output port for communicating time code information formatted according to standards published by the Society of Motion Picture and Television Engineer (SMPTE). Such time code information is input to independent sound, film and video recorders at a performance event to create tracks on each recording for re-synchronizing the pictures and sounds in post-performance editing.

12 Claims, 3 Drawing Sheets

100

102 Receive Satellite Navigation Signals at First Location

104 Extract Date and Time Info

106 Tag a First Recording With Date and Time Information

108 Receive Satellite Navigation Signals at Second Location

110 Extract Date and Time Info

112 Tag a Second Recording With Date and Time Information

114 Combine First and Second Recordings According to Date and Time Tags

116 Generate a Composite Third Recording

TIME-KEEPING SYSTEM AND METHOD FOR SYNCHRONIZING INDEPENDENT RECORDINGS OF A LIVE PERFORMANCE IN POST-RECORDING EDITING

COPENDING APPLICATION

This application is a continuation-in-part of an earlier filed U.S. patent application, Ser. No., 08/232,830, filed on Apr. 22, 1994, which application is incorporated herein by reference.

BACKGROUND OF THE INVENTION

1. Field of the Invention

The invention relates generally to time-keeping and more specifically to equipment and methods for generating highly-accurate clock times from a global positioning system navigation receiver.

2. Description of the Prior Art

The filming, video and audio industries typically operate many recording devices during a single performance to capture the scene and/or sound from many different viewpoints. High performance recordings do not usually record sound and pictures on the same device. Editing is therefore relied upon to combine the recorded sounds and pictures so that they are synchronized with one another in a single final product.

Most people are familiar with the clapper slate board a technician snaps in front of a movie camera when the director yells "action!". The purpose of this is not so well-known. There is a need to synchronize the sound with the picture. When a clapper slate is used, the audible clap is the sound sync point. Time code recording allows a different technique to be used. A time code clock keeps the time-of-day, for example, in hours, minutes, seconds and frames. A time code electronic slate has, in addition to clapsticks and the normal slate information, a time code reader, usually large red light emitting diode (LED) numerals. The time code display matches a time code used to record on the field sound recorder. By shooting a few frames of this slate on the film, a visual sync is established. When transferring the film in an editing session, e.g., with a telecine, all that is necessary is to stop on a frame that has the time code slate in view, enter the time code numbers into the machine synchronizer that controls the playback of the audio roll, and the synchronizer will automatically bring the audio into perfect sync. When the telecine is played the audio will stay in sync until the end of the take, when the camera and sound recorder were stopped.

Digital time codes are recorded on magnetic or optical media to uniquely identify the position of the media at any given point. It is used on optical media, e.g., film, and magnetic media, e.g., audio tape and video tape. Typical time codes contain a clock, control and synchronizing information and a user-definable code area. The clock information is conventionally organized such that increasing time denotes a point further into the reel of film or tape.

A time code is generally used for locating or referencing a specific point within a reel of film or tape. This is most useful in the editing process, and in fact is the basis for most modern videotape editing systems. Time codes may also be used for film editing, film on tape editing, and many other tasks. The availability of user-definable code area offers an almost unlimited range of data storage coincident with the time information. Information such as scene, take, camera roll number, time of day, etc. may be stored in these areas.

Conventional time codes may be divided into two types, magnetic and optical. The Society of Motion Picture and Television Engineers (SMPTE) developed a magnetic media type time code which was the first established version and remains the most widely used. It is recorded on longitudinal tracks on audio or video tape. It was originally specified for thirty frames/second operation, but will work at 29.97 frames/second as well.

The European Broadcasting Union (EBU) time code is standard in Europe and most of Asia, India, Africa and Central and South America. EBU time code is basically the same as SMPTE time code, but is specified for twenty-five frames/second operation. Film time code is also basically the same as SMPTE time code, but specified for twenty-four frames/second operation. DATAKODE, a trademark of Kodak Corporation, is a process using a finely dispersed transparent magnetic coating on a film stock that allows the recording of time code information on the film. It supports time and user bits like SMPTE time code, but in a different format. Vertical interval time code (VITC) is a magnetic media type time code that is designed to be recorded within the vertical interval period of video. It is treated as video by the recorder, but is a digital time code that offers time and user bits like SMPTE time code.

Bar time code is an optical media type of SMPTE time code. It has virtually the same structure as SMPTE time code but is recorded optically in a film camera. It is commercially-available in twenty-four, twenty-five, or thirty frames/second, as marketed by Coherent Communications for Arriflex cameras, in both sixteen millimeter and thirty-five millimeter formats.

Matrix time code is another optical media type time code that offers time and user bit information areas. An optical dot matrix field is used, rather than the linear bar time code, e.g., as used by Aaton in the sixteen millimeter format and Panaflex in the thirty-five millimeter format.

Time codes were once exclusively used by videotape editors. They are now being increasingly used for audio tape editing, film editing, video, audio and film production, audio tape and magnetic film mixing, videodisc mastering and more. In addition to the locating feature of the time bits, the information storage ability of the user bits is adding to the capability of time code systems. With transport synchronizers becoming smaller and cheaper, time code control and autolocation are becoming standard on professional audio and video recorders.

In framed media versus frameless film and tape media, visual information is recorded on a frame-by-frame basis. By playing discreet frames back at a high enough speed, the illusion of motion is created. Each frame of film or video can be identified by recording a number, e.g., a time code, next to the frame. Audio tape and magnetic film are essentially frameless media, e.g., the sound is recorded on a continuous basis with no frames. All any recorded time code information can do is indicate the running time of the audio. Since the time code number occupies about one-half of tape, at fifteen inches-per-second, a problem becomes apparent in reference to editing. One-half the resolution is much too poor for professional editing requirements. One frame of SMPTE time code is approximately thirty-three milliseconds long. Minimum editing standards require resolution to one millisecond, or better. To solve this problem, most time code equipment used with audio has provisions for subframe operation. This typically provides one hundred subframes per frame thereby offering resolution to 330 μs, which is more than enough for professional editing and synchronizing requirements.

The SMPTE time code is a longitudinal time code, although it is not the only such time code. It is designed to run at thirty frames/second, which is the frame rate of video in the NTSC television broadcast system used in North America. (The actual frame rate is 29.97 frames/second, which resulted with the introduction of broadcast color signals compatible with black and white receivers.) The SMPTE time code is a special digital time code comprised of data bits which occupy the same amount of time as one frame of video, e.g., two fields. The time code is locked to the video signal by a time code generator. The SMPTE digital time code is readable either forwards or backwards, and inversion of the time code by accidental phase reversal in wiring does not affect its operation. The time code is also readable at speeds varying from less than one inch-per-second to over 250 inches-per-second, and is usable at recording levels of −15 dB to +10 dB.

SMPTE time code has eighty bits, or cells, in which information may be stored. Twenty-six are used to store time information, thirty-two are used for user bits, sixteen are used for synchronization of the time code, three are unassigned, and three bits are used for control information.

The time code is sychronized to the video signal by the time code generator. The published specification states that the beginning of the eighty-bit time code word must start at the beginning of line #5 of the video signal, during the vertical sync time. Such synchronization is also known as time code phase. If the time code started at line #20 instead of line #5 it would be out of phase. The digital time code used resembles a square wave and suffers a certain amount of degradation each time it is recorded and played back on magnetic media. This is normal, and a time code reader is capable of reading time code off tape with an expected average amount of distortion.

A common feature of time code generators is the slave or jam-sync process. This allows a time code generator to follow the time code off another source, e.g., a tape machine. This would allow for regeneration of time code. There are two basic modes of slaving or jam-syncing time code, hard slave or hard jam and soft slave or one-shot jam. Method one, the hard slave, forces the generator output to always follow the input. Method two, the soft slave, locks up to the input at first but runs free after that.

The main distinction is that hard slave will copy every frame of time code, even bad frames or missing bits. It is a direct copy, but is fresh time code with proper shape and amplitude. Soft slaving will copy the first few frames of time code exactly in order to match up the time code numbers, but will then run on as if it were an independent time code generator. The advantage of this is it will not copy bad frame numbers or missing bits. This technique is used often to repair time code that has been poorly recorded or damaged. Typically the soft slave process will copy the first four to sixteen frames of time code then switch over.

If the time code source in the soft slave process is discontinuous, jumps in the sequence of the time code will occur, such as 01:11:05:21 being followed by 01:15:46:29, e.g., when the production recording was stopped for a few minutes while the master generator ran on. The output of the generator will not follow such discontinuities, because the soft slave generator is essentially a free running generator at this point. If all jumps in time code numbers are needed for reference, then the hard slave process must be used or the soft slave must be re-slaved after each jump in the time code.

SUMMARY OF THE PRESENT INVENTION

It is therefore an object of the present invention to provide a coordinated time code input to a plurality of film, video and audio recorders.

It is another object of the present invention to provide a highly-accurate time code source for recording performances.

It is a still further object of the present invention to provide a device for frame accurate timing between cameras and sound, such as at boat races, large venue concerts, sports events, ground-to-air filming and regular production.

Briefly, an embodiment of the present invention comprises a GPS navigation receiver with a data output port for communicating time codes in SMPTE format. The conventional date and time sentence output of the GPS navigation receiver is combined with a highly-accurate one pulse-per-second (± one microsecond) to form a time-keeping base for the time code output.

An advantage of the present invention is that a system is provided for generating coordinated time codes at independent sites proximate to respective recorders.

Another advantage of the present invention is that a time code generator is provided that is simple to connect to cameras and recorders.

A further advantage of the present invention is that a system is provided that is accurate to within a microsecond of true time.

A still further advantage of the present invention is that a time code output is provided that is compatible with commercially-available equipment.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
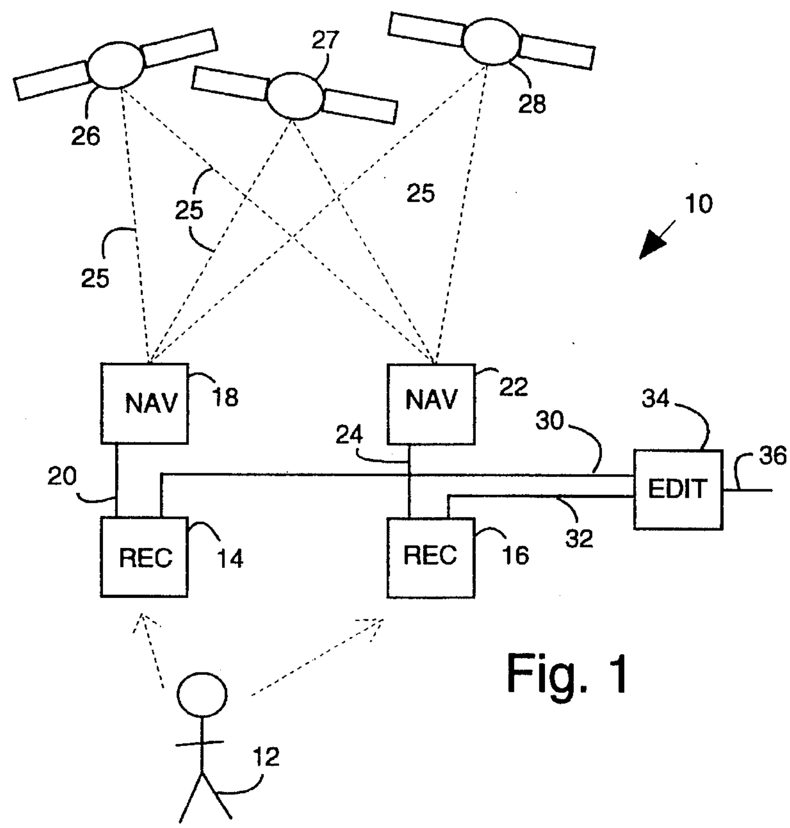
FIG. 1 is a block diagram of a time-keeping system for synchronizing sound and picture recordings from a plurality of independent recording devices at a shared performance in a first embodiment of the present invention.

FIG. 1 illustrates a time-keeping system for synchronizing sound and picture recordings from a plurality of independent recording devices at a shared performance in a first embodiment of the present invention, referred to herein by the general reference numeral 10. A "shared performance" is an event simultaneously shared amongst several observers, e.g., independent cameras. The system 10 is used to record the live performance of a performer 12, e.g., a singer or actor. A recorder 14 captures the performance from its vantage point while another recorder 16 independently captures the same performance from its own vantage point. A navigation satellite receiver 18 provides highly-accurate date and time information to the recorder 14 over a connection 20. Similarly, another navigation satellite receiver 22 provides highly-accurate date and time information to the recorder 16 over a connection 24. The independent date and time sources for the recorders 14 and 16 allows them to be separated by great distances, such as on opposite sides of the earth. If the recorders 14 and 16 are physically proximate to one another, a single one of the navigation satellite receivers 18 or 22 may be used to provide date and time information to both recorders. The recorders 14 and 16 preferably comprise audio tape recorders, video tape cameras and/or movie film cameras with time code input ports. Other types of recorders of performances are also possible.

Both navigation satellite receivers 18 and 22 receive a plurality of microwave radio transmissions 25 from a constellation of orbiting satellites, which are represented by a set of three satellites 26–28. The navigation satellite receivers 18 and 22 do not necessary need to be in receipt of microwave radio signals from identical constellations of satellites. Each satellite 26–28 has an atomic clock synchronized system-wide to provide highly accurate time clock information, e.g., the time-of-day and the calendar date. Such microwave radio transmissions and time information are used conventionally by prior art navigation satellite receivers to estimate the earth position of the respective navigation receiver. Such position determinations are necessary to achieve sub-microsecond accurate time outputs, especially over widely scattered sites.

The recorders 14 and 16 each transmit their respective recordings over a pair of connections 30 and 32 to an editing station 34. The connections 30 and 32 represent the communication of the respective recordings by wire, radio link and/or tape or film delivery to the editing station 34, e.g., a telecine suite or an audio layback suite. Each recording delivered to the editing station 34 has been date and time tagged, using date and time information received by the recorders 14 and 16 over connections 20 and 24. The date and time information is preferably formatted according to the published standard of the American National Standard Institute (New York, N.Y.) for video and audio tape time and control code, ANSI/SMPTE 12M-1986. Other formats are possible, and in foreign countries may also be desirable, for example EBU time code. The ANSI/SMPTE 12M-1986 format comprises eighty-bit data words.

The navigation satellite receivers 18 and 22 operate with the same navigation satellite system (SNS) transmissions, such as from the American global positioning system (GPS), or the Russian system called the global orbiting navigation satellite system (GLONASS). Orbiting GPS or GLONASS satellites transmit signals that are received by the navigation satellite receivers 18 and 22, and the transit times of these signals from several determinable heavenly orbit positions can be used in a position and altitude determination. For more information on GLONASS, refer to copending U.S. patent application, GLOBAL ORBITING NAVIGATION SATELLITE SYSTEM RECEIVER, Ser. No. 08/287,187, filed Aug. 8, 1994, which is incorporated herein by reference.

The GPS includes up to twenty-four satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geo-synchronous, with 0.5 sidereal day (11.967 hours) orbital time intervals, so that the satellites move with time relative to the earth below. Theoretically, three or more GPS satellites will be visible from most points on the earth's surface, and visual access to three or more such satellites can be used to determine an observer's position anywhere on the earth's surface, 24 hours per day. Each satellite carries a cesium and rubidium atomic clock to provide timing information for the signals transmitted by the satellites. Internal clock correction is provided for each satellite clock.

Each GPS satellite transmits two spread spectrum, L-band carrier signals, an L1 signal having a frequency f1=1575.42 MHz and an L2 signal having a frequency f2=1227.6 MHz. The L1 signal from each satellite is binary phase shift key (BPSK) modulated by two pseudo-random noise (PRN) codes in phase quadrature, designated as the coarse acquisition code (C/A-code) and precision-code (P-code). The L2 signal from each satellite is BPSK modulated by only the P-code.

Use of the PRN codes allows several GPS satellite signals to be used simultaneously to determine an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of $10^{10}$=10.23 MHz. A second PRN code for each GPS satellite, sometimes referred to as a clear/acquisition code or C/A-code, is intended to facilitate rapid satellite signal acquisition and hand-over to the P-code and is a relatively short, coarser grained code having a clock or chip rate of 10=1.023 MHz. The C/A-code for any GPS satellite has a length of 1023 chips and thus repeats every millisecond. The full P-code has a length of 259 days, with each satellite transmitting a unique portion of the full P-code. The portion of P-code used for a given GPS satellite has a length of precisely one week (7.000 days) before this code portion repeats.

The GPS satellite bit stream includes navigational information on the ephemeris of the transmitting GPS satellite and an almanac for all GPS satellites, with additional parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *Guide To GPS Positioning*, edited by David Wells, Canadian GPS Associates, 1986.

A second navigation satellite system is the global orbiting navigation satellite system (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.80 relative to the equator, and the three orbital planes are separated from each other by multiples of 1200 longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the earth every 8 days. The GLONASS system uses two carrier signals L1 and L2 with frequencies of $f1=(1.602+9k/16)$ GHz and $f2=(1.246+7k/16)$ GHz, where k (0,1,2, . . . , 23) is the channel or satellite number. These frequencies lie in two bands at 1.597–1.617 GHz (L1) and 1.240–1.260 GHz (L2). The L1 code is modulated by a C/A-code (chip rate =0.511 MHz) and by a P-code (chip rate =5.11 MHz). The L2 code is presently modulated only by the P-code. The GLONASS satellites also transmit navigational data at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Figure 2:
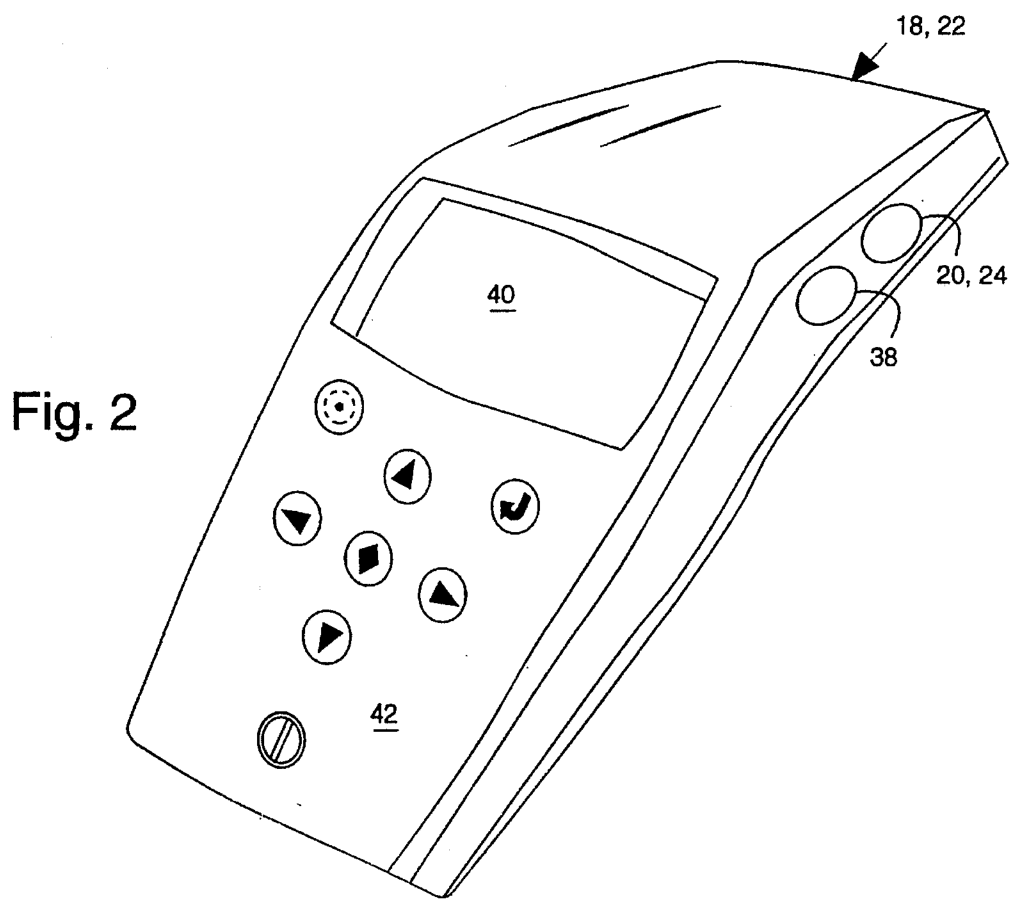
FIG. 2 is a perspective view of the navigation satellite receiver included in FIG. 1.

As shown in FIG. 2, each of the navigation satellite receivers 18 and 22 comprise the connections 20 and 24, an auxiliary connector 38, a liquid crystal display (LCD) 40 and a keyboard 42. Commercially available hand-held navigation satellite receivers may be used and appropriately modified to output data and time information, e.g., SCOUT MASTER, as marketed by Trimble Navigation, Ltd., (Sunnyvale, Calif.).

Figure 3:
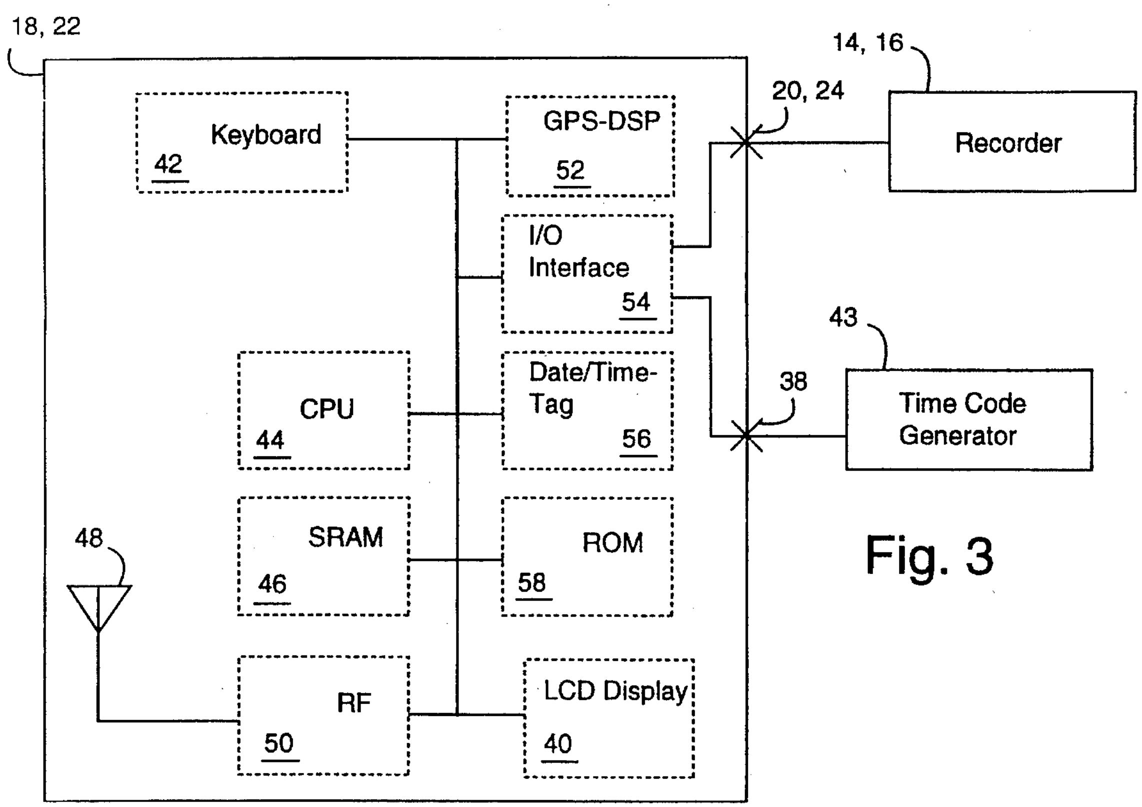
FIG. 3 is a block diagram of the navigation satellite receiver of FIGS. 1 and 2.

In FIG. 3, the navigation receivers 18 and 22 are shown in block diagram to further comprise the connectors 20 and 24 for output to recorders 14 and 16. A commercially-available time code generator 43 (FIG. 3 only), e.g., the SB-2 GPS, as marketed by Denecke, Inc. (Hollywood, Calif.), may also be used in conjunction with the navigation satellite receivers 18 and 22 to assume the task of generating a compatible time code source for direct connection to a time code camera, for example. The SB-2 GPS generates time code at twenty-four, twenty-five, 29.97 df and thirty frames per second, and will jam to both the output connection 38 and normal SMPTE/EBU time code. The time code output signal of the SB-2 GPS is three volts, which is sufficient to drive most time code cameras in use today. The input level reads down to 0.3 volts and can read most time code sources. The SB-2 GPS time can be locally set with the internal push button and also be used as a strobe to check camera shutter speed. Battery life of the SB-2 GPS is up to sixty hours. The stability is ±3 frames over eight hours from −10C to +60C with the standard time base and ±1 frame per eight hours from −40C to +85C with the temperature compensated crystal oscillator (TCXO) option.

Such a time code generator preferably also can be used as a master clock. The time code generator is preferably able to set time code from the navigation satellite information deciphered by the navigation satellite receivers 18 and 22 at twenty-four, twenty-five, 29.97 df and thirty frames/second. A microprocessor (CPU) 44 is coupled to the keyboard 42 and LCD 40, and also static random access memory (SRAM) 46, a microwave receiver antenna 48 connected to a radio frequency (RF) downconverter 50, a GPS digital signal processor (DSP) 52, an input/output (I/O) interface 54, a date and time tag unit 56 and a read only memory (ROM) 58. A microcomputer, such as the 68000 marketed by Motorola (Phoenix, Ariz.), may be used to implement CPU 44 to generate and recognize alphanumeric user ID codes, to frame and de-frame message packets shipping out and coming in, and to do message protocol and error detection and correction for message frames. The antenna 48 receives radio signals from the orbiting GPS satellites 26–28, and RF stage 50 amplifies and down converts such radio signals. The I/O ports 38 and 20 or 24 may be separate or combined into a single connector. SRAM 46 has a capacity of 64 K bytes and ROM 58 stores eight megabytes. ROM 58 has machine code programmed into it that embodies an operating system for user communication via the keyboard 42 and the LCD 40.

The antenna 48 receives range information from orbiting GPS satellites and sends its amplified signals to the GPS-DSP 52. The CPU 44 helps decode the signals received and converts the information under a program stored in ROM 58 into earth-centered, earth-fixed (ECEF) position determinations which are temporarily stored in SRAM 46. The date/time-tag unit 56 associates a date and/or time tag with each such position determination stored in SRAM 46. Time code information is generated for connections 20, 24 and 38 by combining a one-pulse-per-second output from the GPS-DSP 52 with the conventional date and time information available from deciphering the navigation satellite transmissions. For example, in the GPS, code transmission epochs repeat every one millisecond, these epochs are accumulated to for the one-pulse-per-second output, accurate to one microsecond. The ROM 58 further includes an application program for generating SMPTE time codes for output on connections 20, 24 and 38 from the signals deciphered by the GPS-DSP 52.

Figure 4:
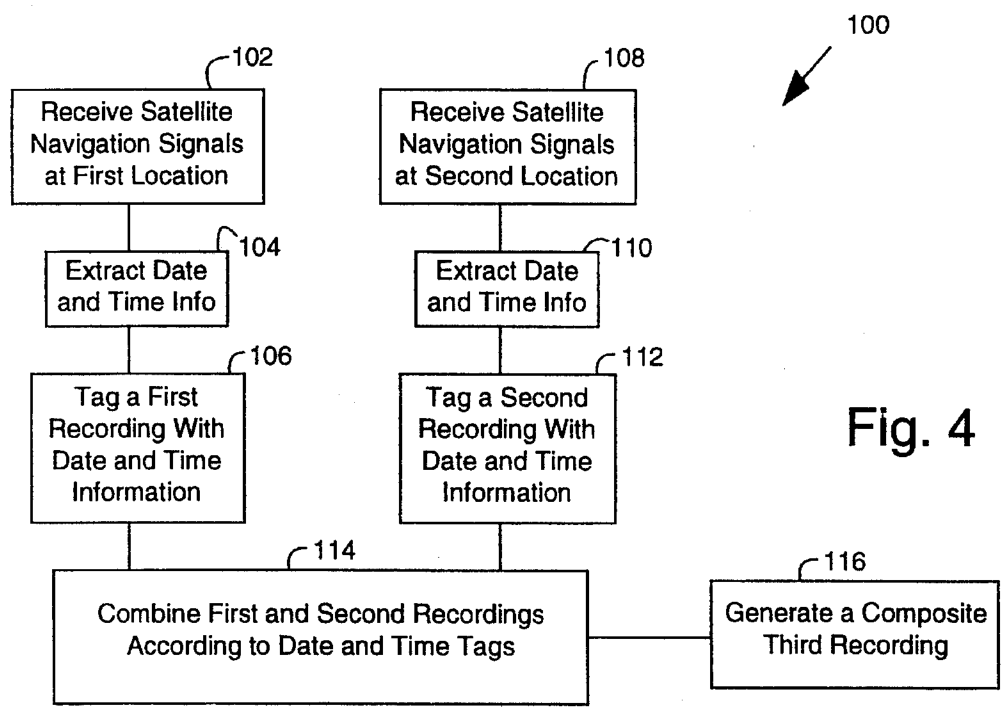
FIG. 4 is a flowchart diagram of a method for synchronizing sound and picture recordings from a plurality of independent recording devices at a shared performance, such as shown in FIG. 1.

FIG. 4 illustrates a method 100 for synchronizing sound and picture recordings from a plurality of independent recording devices at a shared performance. The method 100 comprises a step 102 for receiving navigation satellite signals at a first location proximate to a first performance recording device (e.g., recorder 14) with a first navigation satellite receiver (e.g., receiver 18) at a performance (e.g., performer 12). A step 104 derives a first date and time code information with the first navigation satellite receiver. A step 106 tags a first recording generated by the first performance recording device with the date and time code information. A step 108 operates simultaneously with the step 102 and receives navigation satellite signals at a second location proximate to a second performance recording device (e.g., recorder 16) with a second navigation satellite receiver (e.g., receiver 22) at the performance. A step 110 extracts a second date and time code information with the second navigation satellite receiver. A step 112 tags a second recording generated by the second performance recording device with the date and time code information. A step 114 combines the first and second recordings, according to a synchronization between the first and second date and time code information. A step 116 generates a third recording from the date and time synchronized portions of the first and second recordings, wherein the third recording presents an apparently time-seamless blend of the performance from a plurality of viewpoints. In step 114, the combining and generating may be done in real-time with the performance such that the third recording is delayed from the performance by an insubstantial amount of time. Alternatively, in step 114, the combining and generating are done post the performance such that the third recording is independent of the time of the performance. The combining, may, for example, be done in a telecine suite or audio layback suite.

Figure 5:
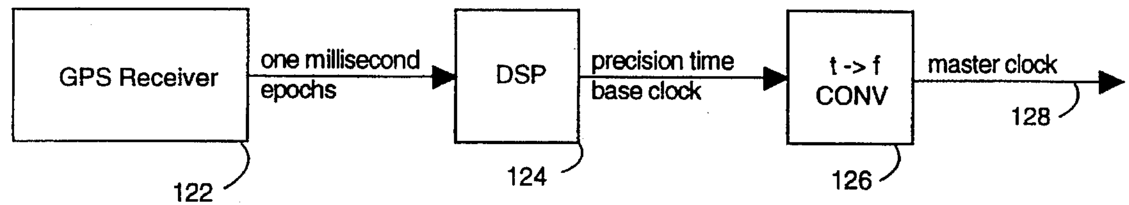
FIG. 5 is a block diagram of a master clock for film and video production equipment.

FIG. 5 illustrates a master clock 120 for film and video production equipment. The master clock 120 comprises a GPS navigation satellite receiver 122 and a digital signal processor 124 for accumulating and averaging code epochs which occur each millisecond in time and having a precision time-base output. A time-period-to-frequency converter 126 is connected to the precision time-base output and has a precision clock output 128 for synchronizing film and video equipment. The clock output 128 is conventionally formatted and distributed, and is preferably compatible with present-day commercially-available equipment that have master clock input ports.

Figure 6:
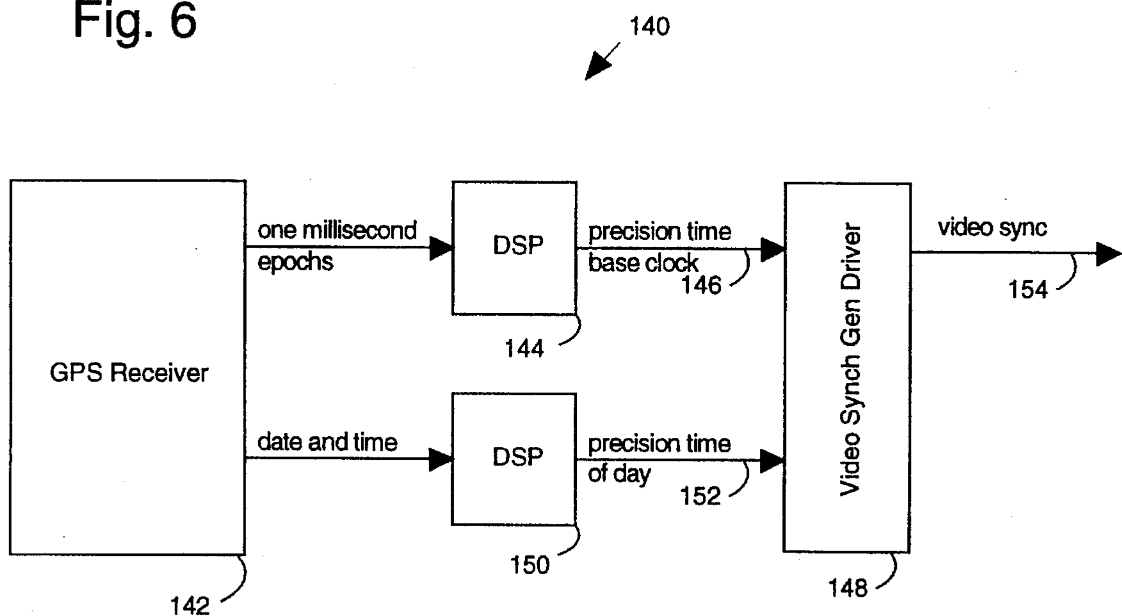
FIG. 6 is a block diagram of a video sync-generator for stable frame reference control.

FIG. 6 illustrates a video sync-generator 140 for stable frame reference control. The sync-generator 140 comprises a GPS navigation satellite receiver 142 and a first digital signal processor 144 for accumulating and averaging code epochs which occur each millisecond in time. A precision time-base signal 146 is output to a video sync-generator driver 148. A second digital signal processor 150 is used for deciphering date and time information publicly broadcast over orbiting navigation satellite transmissions that are detected by the receiver 142. A time-of-day signal 152 is combined with the precision time base clock 146 and seconds are divided into frame periods for video frame sequencing and synchronizing. A video-sync output 154 is conventionally formatted and distributed, and is preferably compatible with present-day commercially-available video equipment that have video-sync input ports.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for synchronizing sound and picture recordings from a plurality of independent continuous recording devices at a common event, the method comprising the steps of:

receiving navigation satellite signals at a first location proximate to a first continuous recording device with a first navigation satellite receiver at a common event;

deriving from said navigation satellite signals a first date and time code information with said first navigation satellite receiver; and tagging a first continuous recording generated by said first continuous recording device with said date and time code information at one of a motion picture video frame repetition rate.

2. The method of claim 1, further comprising the steps of:

receiving navigation satellite signals at a second location proximate to a second continuous recording device with a second navigation satellite receiver at said common event;

deriving a second date and time code information with said second navigation satellite receiver wherein said received navigation satellite signals from said second navigation satellite receiver have a common time base with said received navigation satellite signals from said first navigation satellite receiver; and tagging a second continuous recording generated by said second continuous recording device with said date and time code information at said motion picture or video frame repetition rate, wherein said first and second recordings have corresponding date and time code information for portions of their respective continuous recordings that coincided in their original time of recording.

3. The method of claim 2, further comprising the steps of:

combining said first and second continuous recordings according to a synchronization between said first and second date and time code information; and generating a third recording from date and time synchronized portions of said first and second recordings, wherein said third recording presents an apparently time-seamless blend of said common event from a plurality of viewpoints.

4. The method of claim 3, wherein:

the combining and generating are done in real-time with said common event such that said third recording is delayed from said common event by an insubstantial amount of time.

5. The method of claim 3, wherein:

the combining and generating are done post said common event such that said third recording is independent of the time of said common event.

6. A master clock for film and video production equipment, comprising:

a navigation satellite receiver for receiving signals from a constellation of navigation satellites with atomic clocks having system-wide synchronization and with digital signal processing (DSP) means for accumulating and averaging code epochs which occur each millisecond in time providing for a precision time-base output; and time-period-to-frequency conversion means connected to said precision time-base output and having a precision clock output for synchronizing film and video equipment at frame repetition rate intervals.

7. A video sync-generator for stable frame reference control, comprising:

a navigation satellite receiver for receiving signals from a constellation of navigation satellites with atomic clocks having system-wide synchronization and with digital signal processing means for accumulating and averaging code epochs which occur each millisecond in time providing for a precision time-base output;

processing means for deciphering date and time information broadcast over said orbiting navigation satellite transmissions; and video sync-generator output means connected to the navigation satellite receiver and the processing means providing for a stable frame reference control output signal to drive video cameras and recorders at frame repetition rate intervals.

8. A time-keeping system for synchronizing sound and picture recordings from a plurality of independent recording devices at a shared performance, comprising:

a first navigation satellite receiver with digital signal processing (DSP) means for deciphering a date and time-of-day information broadcast by a constellation of orbiting navigation satellite having atomic clocks synchronized system-wide time, and time code output generation means connected to the DSP for formatting a first continuous output of digital time codes corresponding to said synchronized system-wide time; and first continuous recording means connected to the first navigation satellite receiver for recording said first continuous output of formatted digital time codes on a first continuous recording medium of at least one of movie film, video tape and audio tape.

9. The system of claim 8, further comprising:

a second navigation satellite receiver with digital signal processing (DSP) means for independently deciphering and estimating said synchronized system-wide time, and time code output generation means connected to the DSP for formatting a second continuous output of digital time codes corresponding to said synchronized system-wide time; and second continuous recording means connected to the second navigation satellite receiver for recording said second continuous output of formatted digital time codes on a second continuous recording medium of at least one of movie film, video tape and audio tape, wherein portions of said first and second continuous recording mediums that coincided in their original recording times have corresponding portions of said first and second continuous outputs formatted.

10. The system of claim 9, further comprising:

editing means connected to the first and second recording means for combining said first and second recording mediums according to said recorded formatted digital time codes to create a time-synchronized composite recording.

11. The system of claim 8, further comprising:

second recording means located proximate to and connected to the first navigation satellite receiver for recording said formatted digital time codes on at least one of movie film, video tape and audio tape.

12. The system of claim 8, further comprising:

second recording means located proximate to and connected to the first navigation satellite receiver for recording said formatted digital time codes on at least one of movie film, video tape and audio tape; and editing means connected to the first and second recording means for combining respective recordings of each according to said recorded formatted digital time codes to create a time-synchronized composite recording.

* * * * *